Figure 1:
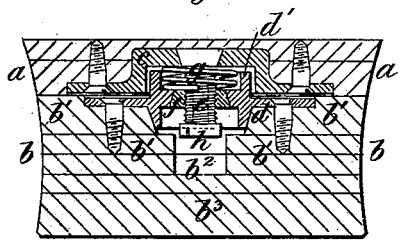

(No Model.) 2 Sheets—Sheet 1.

W. BROWN & W. PEOVER.
HEEL FOR BOOTS AND SHOES.

No. 243,845. Patented July 5, 1881.

Attest:
Geo. T. Smallwood Jr.
L. M. Hopkins.

Inventors:
William Brown.
William Peover.
By Knight Bros. attys (No Model.) 2 Sheets—Sheet 2.

W. BROWN & W. PEOVER.
HEEL FOR BOOTS AND SHOES.

No. 243,845. Patented July 5, 1881.

Attest
Geo. T. Smallwood Jr.
L. M. Hopkins

Inventors
William Brown
William Peover
By Knight Bros.
attys

N. PETERS. Photo-Lithographer, Washington, D. C.

UNITED STATES PATENT OFFICE.

WILLIAM BROWN, OF KING STREET, NORTH CAMDEN TOWN, AND WILLIAM PEOVER, OF LEIGH STREET, BURTON CRESCENT, COUNTY OF MIDDLESEX, ENGLAND.

HEEL FOR BOOTS AND SHOES.

SPECIFICATION forming part of Letters Patent No. 243,845, dated July 5, 1881.

Application filed May 3, 1881. (No model.) Patented in England October 2, 1880.

*To all whom it may concern:*

Be it known that we, WILLIAM BROWN and WILLIAM PEOVER, subjects of the Queen of Great Britain, residing respectively at King Street, North Camden Town, and Leigh Street, Burton Crescent, both in the county of Middlesex, England, have invented certain new and useful Improvements in Revolving Heels for Boots and Shoes, (for which we have received Letters Patent in England, No. 4,003, dated October 2, 1880,) of which the following is a specification.

The invention has for its object improvements in revolving heels for boots and shoes, and relates to means whereby the revolving portion of the heel is capable of ready adjustment for wear without the necessity for using a screw-driver or other tool, is formed solid across the wearing-surface thereof, and is capable of being fixed firmly in position for use without exposing the adjusting and fixing devices to wet and dirt. For this purpose we fix to one part of the heel a metal fixing formed to act in combination with a corresponding fixing attached to the other part of the heel. A spring is placed between these fixings with a tendency to separate them from each other, while a male screw formed on or fixed to or rotated by the one part acts in combination with a female screw rotated by or formed on or fixed to the other part. The male or female screw is so formed or fitted as to be capable of being rotated or held by one of the heel-fixings, so as to enable the two parts of the heel to be separated from each other a certain distance by rotating the revolving portion of the heel. Then, when further separation of such parts is prevented by a stop, the head or end of the male screw or the female screw or nut, which is so formed as to fit in a suitable recess or in suitable recesses in one of the fixings, will slip out of its recess or recesses, and thereby enable the revolving part of the heel to be turned a suitable distance around its axis, after which the revolving portion of the heel can be screwed up tightly against the fixed part thereof, ready for use.

In order that our said invention may be more clearly understood and readily carried into effect, we will proceed, aided by the accompanying drawings, more fully to describe the same.

In all the figures like parts are marked with similar letters of reference.

Figure 7:
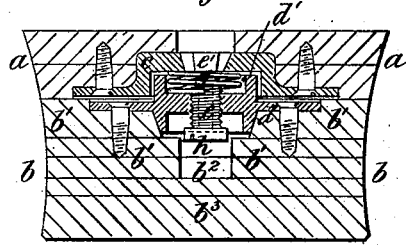
Figure 2:
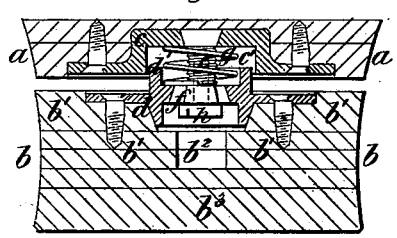
Figure 8:
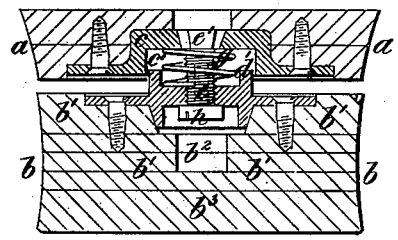
Figure 3:
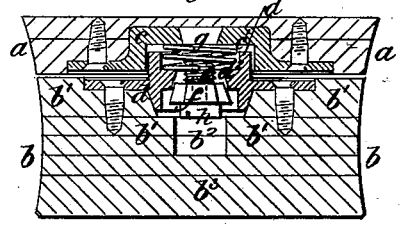
Figure 9:
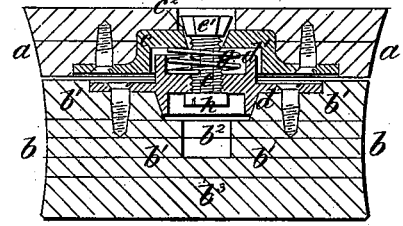
Figure 4:
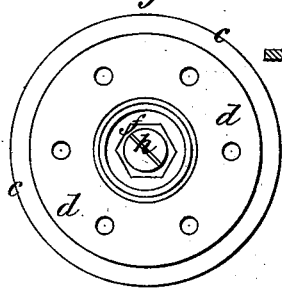
Figure 5:
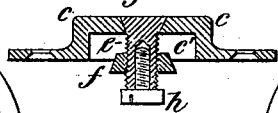
Figure 10:
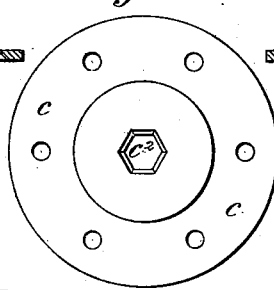
Figure 11:
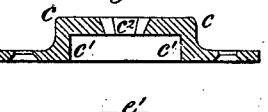
Figure 6:
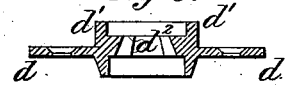
Figure 12:
Figure 13:
Figure 14:
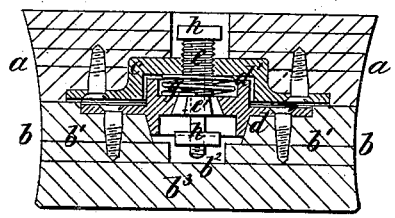
Figure 15:
Figure 16:
Figure 17:
Figure 18:
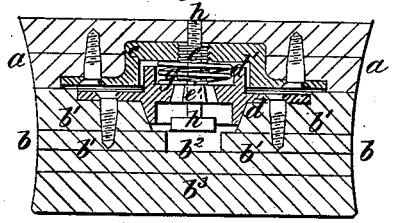
Figure 19:
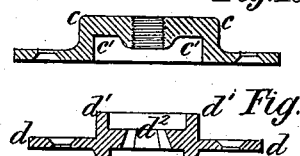
Figure 20:
Figure 21:
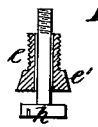
Figure 22:
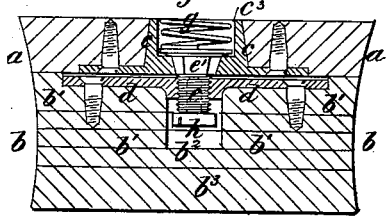
Figure 23:
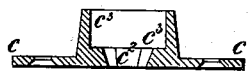
Figure 25:
Figure 24:

Figs. 1, 2, and 3 are cross-sections of a revolving boot-heel constructed according to our invention, with capability of ready adjustment, and representing the revolving portion of the heel in three different positions. Fig. 4 is an under-side view of the two metal fixings separately. Fig. 5 is a cross-section of the upper fixing, with the screw-nut and stop in position, and Fig. 6 is a cross-section of the lower fixing. Figs. 7, 8, and 9 are sections corresponding with those shown at Figs. 1, 2, and 3, but representing a slight modification. Fig. 10 is a plan, and Fig. 11 a cross-section, of the upper fixing. Fig. 12 is a cross-section, showing the adjusting-screw and stop separately, and Fig. 13 is a cross-section of the lower fixing. Fig. 14 is a cross-section of another modification, and Figs. 15, 16, and 17 are sectional views of parts thereof. Fig. 18 is a cross-section of another modification, and Figs. 19, 20, and 21 are sectional views of parts thereof; and Fig. 22 is a cross-section of another modification, and Figs. 23, 24, and 25 are sectional views of parts thereof.

We will first describe the arrangement represented at Figs. 1 to 6. $a$ represents the fixed part of the heel, and $b$ the revolving portion thereof. $c$ and $d$ are plates or fixings, secured respectively to the parts $a$ and $b$ by screws or otherwise. The plate or fixing $c$ is formed with a socket or recess, $c'$, and has fixed rigidly in the center of such socket a screw, $e$. The plate or fixing $d$ is formed with an annular part, $d'$, fitting loosely within the socket $c'$. In the center of the fixing $d$ is a hole, $d^2$, shaped to fit the beveled sides of the nut $f$. $g$ is a spring interposed between the parts $a$ and $b$, and $h$ is a stop fixed securely into the screw $e$.

In Fig. 1 the revolving part $b$ of the heel is shown screwed up tightly against the part $a$, in position for use; but when it is desired to turn the revolving part $b$ a portion of a revolution in order to present a fresh wearing-surface, such part $b$ is rotated so as to separate it from the part $a$ until the nut $f$ abuts against the stop $h$, as shown at Fig. 2. Then, by continuing the rotation of the part $b$ in the same direction, the fixing $d$ is caused to rise on the beveled sides of the nut $f$ out of gear with the latter, as shown at Fig. 3, and when in its rotation it again coincides in position with such nut the spring $g$ acts to force the fixing $b$ again into gear with the nut $f$, when the revolving part $b$ will have been turned, say, a sixth of a revolution. The parts are then again screwed tightly up to the position shown at Fig. 1, when the boot will be ready for use.

In applying the parts to a boot-heel the fixing $c$ is first secured to the fixed portion of the heel. The fixing $d$ is secured to the parts $b'$ of the revolving part $b$. The stop $h$ is then passed through the hole $b^2$ and securely fixed in position, after which the wearing portion $b^3$ of the heel is fixed in position, thereby offering a continuous wearing-surface and efficiently protecting the adjusting and fixing devices.

The modification represented at Figs. 7 to 13 is similar to the foregoing, except that the loose nut $f$ is dispensed with. The fixing $d$ is tapped to fit the screw $e$, and the latter, instead of being rigidly secured to the fixing $c$, is provided with a head, $e'$, formed with beveled sides to fit a correspondingly-shaped socket, $c^2$, formed in the fixing $c$. Thus in rotating the part $b$ for adjustment the head $e'$ of the screw $e$ is caused to rise out of its socket $c^2$, as shown at Fig. 9, turn round a portion of a revolution, and then fall again into its socket, after which the parts are screwed up tightly for use.

The modification represented at Figs. 14 to 17 is similar to that shown at Figs. 7 to 13, except that the screw $e$ is reversed in position. The fixing $c$, instead of the fixing $d$, is tapped to fit the screw $e$. The head $e'$ of said screw fits in a socket or recess, $d^2$, formed in the part $d$, and the stop $h$ is formed of a bolt passed entirely through the screw $e$, and provided at its outer end with a nut to form the stop. The method of adjustment is similar to that of the arrangements before described.

The modification represented at Figs. 18 to 21 is similar to that shown at Figs. 14 to 17, except that the stop $h$ passes through the screw $e$ and is screwed into the fixed part of the heel. In some cases, however, we may fix the stop $h$ to the outside of the screw $e$, such screw being made solid.

The modification represented at Figs. 22 to 25 is similar to that shown at Figs. 7 to 13, except that the socket $c'$ of the fixing $c$ and the annular part $d'$ of the fixing $d$ are dispensed with. The spring $g$ is placed in a socket, $c^3$, formed at the upper part of the fixing $c$, and bears upon the head $e'$ of the screw $e$, which is enlarged for the purpose, as clearly shown at Fig. 25.

If desired, the stop $h$ may be dispensed with, in which case, when it is desired to adjust the revolving part $b$ of the heel, such revolving part $b$ is unscrewed from the screw $e$ and entirely removed from the part $a$, when the screw $e$ can be partially rotated by hand, after which the part $b$ is again screwed tightly up, when the boot will be ready for use.

We would here remark that the head of the adjustable screw or the nut may be otherwise shaped, or may be provided with studs or projections to fit corresponding sockets or recesses in the fixing to which it is applied, so long as the same can be caused to slip or be moved out of its socket or recess, and partially turned round for adjustment, in the manner hereinbefore described.

Having thus described the nature of our said invention and the mode in which we carry the same into effect, we would have it understood that what we claim is—

1. The combination of plates $c$ and $d$ and screw $e$, provided with suitable holding device, all working in manner herein described, and for the purpose stated.

2. The spring $g$, in combination with screw $e$, holding device, and plates $c$ and $d$, as set forth.

WM. BROWN.
WILLIAM PEOVER.

Witnesses:
B. J. B. MILLS,
C. M. WHITE.